(12) United States Patent
Sheperek et al.

(10) Patent No.: US 10,534,551 B1
(45) Date of Patent: Jan. 14, 2020

(54) MANAGING WRITE OPERATIONS DURING A POWER LOSS

(71) Applicant: Micron Technology, Inc., Boise, ID (US)

(72) Inventors: Michael W. Sheperek, Longmont, CO (US); James P. Crowley, Longmont, CO (US)

(73) Assignee: MICRON TECHNOLOGY, INC., Boise, ID (US)

(*) Notice: Subject to any disclaimer, the term of this patent is extended or adjusted under 35 U.S.C. 154(b) by 21 days.

(21) Appl. No.: 16/016,482

(22) Filed: Jun. 22, 2018

(51) Int. Cl.
*G06F 3/06* (2006.01)
*G06F 12/10* (2016.01)

(52) U.S. Cl.
CPC .......... *G06F 3/0619* (2013.01); *G06F 3/0638* (2013.01); *G06F 3/0659* (2013.01); *G06F 3/0679* (2013.01); *G06F 12/10* (2013.01); *G06F 2212/1032* (2013.01); *G06F 2212/2022* (2013.01)

(58) Field of Classification Search
CPC .... G06F 3/0619; G06F 3/0611; G06F 3/0604; G06F 3/0638; G06F 3/0659; G06F 3/0679; G06F 12/00; G06F 12/02; G06F 12/10; G06F 12/1027; G06F 12/0246; G06F 2212/1032; G06F 2212/2022; G06F 2212/7201
USPC ........................................................ 711/103
See application file for complete search history.

(56) References Cited

U.S. PATENT DOCUMENTS

| 8,462,552 | B2* | 6/2013 | Ghodsi | G11C 11/005 365/185.11 |
| 2008/0209112 | A1* | 8/2008 | Yu | G06F 12/0246 711/103 |
| 2008/0250195 | A1* | 10/2008 | Chow | G06F 12/0246 711/103 |
| 2009/0265513 | A1* | 10/2009 | Ryu | G06F 3/0619 711/149 |
| 2009/0292865 | A1* | 11/2009 | Hong | G06F 3/0613 711/103 |
| 2011/0264846 | A1* | 10/2011 | Oh | G11C 7/1051 711/103 |
| 2012/0311237 | A1* | 12/2012 | Park | G06F 12/0246 711/103 |
| 2013/0297894 | A1* | 11/2013 | Cohen | G06F 3/0679 711/154 |
| 2014/0108715 | A1* | 4/2014 | Olbrich | G06F 13/1657 711/103 |
| 2015/0046625 | A1* | 2/2015 | Peddle | G11C 16/10 710/308 |

(Continued)

*Primary Examiner* — Shawn X Gu
*Assistant Examiner* — Jean C Edouard
(74) *Attorney, Agent, or Firm* — Nicholson De Vos Webster & Elliott LLP

(57) ABSTRACT

Exemplary methods, apparatuses, and systems include a memory controller detecting that an asynchronous power loss event has occurred. Upon determining that a write operation is in progress to a first type of non-volatile memory element, the memory controller cancels the write operation and retrieves data associated with the write operation. The memory controller sends a request for a second physical address pointing to a second type of non-volatile memory element. Upon receiving a second physical address corresponding to a logical address, the memory controller stores the data at the second physical address.

20 Claims, 4 Drawing Sheets

(56) References Cited

U.S. PATENT DOCUMENTS

2015/0161038 A1\* 6/2015 Lee .................... G06F 12/0246
711/103

\* cited by examiner

MANAGING WRITE OPERATIONS DURING A POWER LOSS

FIELD OF THE INVENTION

The various embodiments described in this document relate to memory systems, and more specifically, relate to data recovery after experiencing a power loss in a memory system.

BACKGROUND OF THE INVENTION

Modern storage devices are frequently composed of non-volatile storage media such as NAND flash. Devices designed to manage requests to read and write data on the NAND flash balance performance and robustness for each operation. A computing system coupled to a storage device managing NAND flash dedicates resources to a write operation sent to the storage device until the storage device confirms to the computing system that the write operation has successfully completed. The storage device also dedicates resources to the write operation until it confirms the data in the write operation has been successfully written to the NAND flash itself. After successful completion, the resources are released for further use. It is desirable to reduce the duration of the dedication of these resources.

Unexpected power losses can cause inconsistent states in storage devices on recovery. Non-volatile storage is increasingly storing more data in the same space. For example, triple-level cell (TLC) flash is a type of NAND flash memory that stores three bits of data per cell. The amount of time and energy it takes to precisely calibrate the voltage levels in the non-volatile storage, however, increases with the density. This increases the potential for inconsistent states after a power loss, because the in-flight operations take longer to complete and are more power intensive. It is desirable to avoid these inconsistent states without requiring a client of the non-volatile storage to send a new write operation.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

Aspects of the present disclosure are directed to recovering data after a write operation failure in a memory system. An example of a memory system is a storage system, such as a solid-state drive (SSD). In some embodiments, the memory system is a hybrid memory/storage system. In general, a host system can utilize a memory system that includes one or more memory components. The host system can provide data to be stored at the memory system and can request data to be retrieved from the memory system.

Embodiments include a memory system sending confirmation of a successful write operation to a host system prior to detecting confirmation of success of the write operation from the underlying non-volatile memory element. As a result, the memory system and host can release and reuse system resources sooner than, e.g., when confirmation was only sent after the memory system detected confirmation from the underlying non-volatile memory element. In conventional memory systems, sending confirmation of a successful write before detecting confirmation from the underlying non-volatile memory element is impractical because malfunctioning non-volatile memory may cause the write operation to the non-volatile memory element to fail after the confirmation of success has been sent. Embodiments allow the memory controller to recover and rewrite the data to functional non-volatile memory element without disrupting the host system.

The present disclosure also describes embodiments that respond to an unexpected power loss while reducing recovery time after restoration of power. For example, embodiments include a memory system canceling write operations to a first type of non-volatile memory element after determining that power has been lost, and writing the data to a second type of non-volatile memory element instead.

Figure 1:
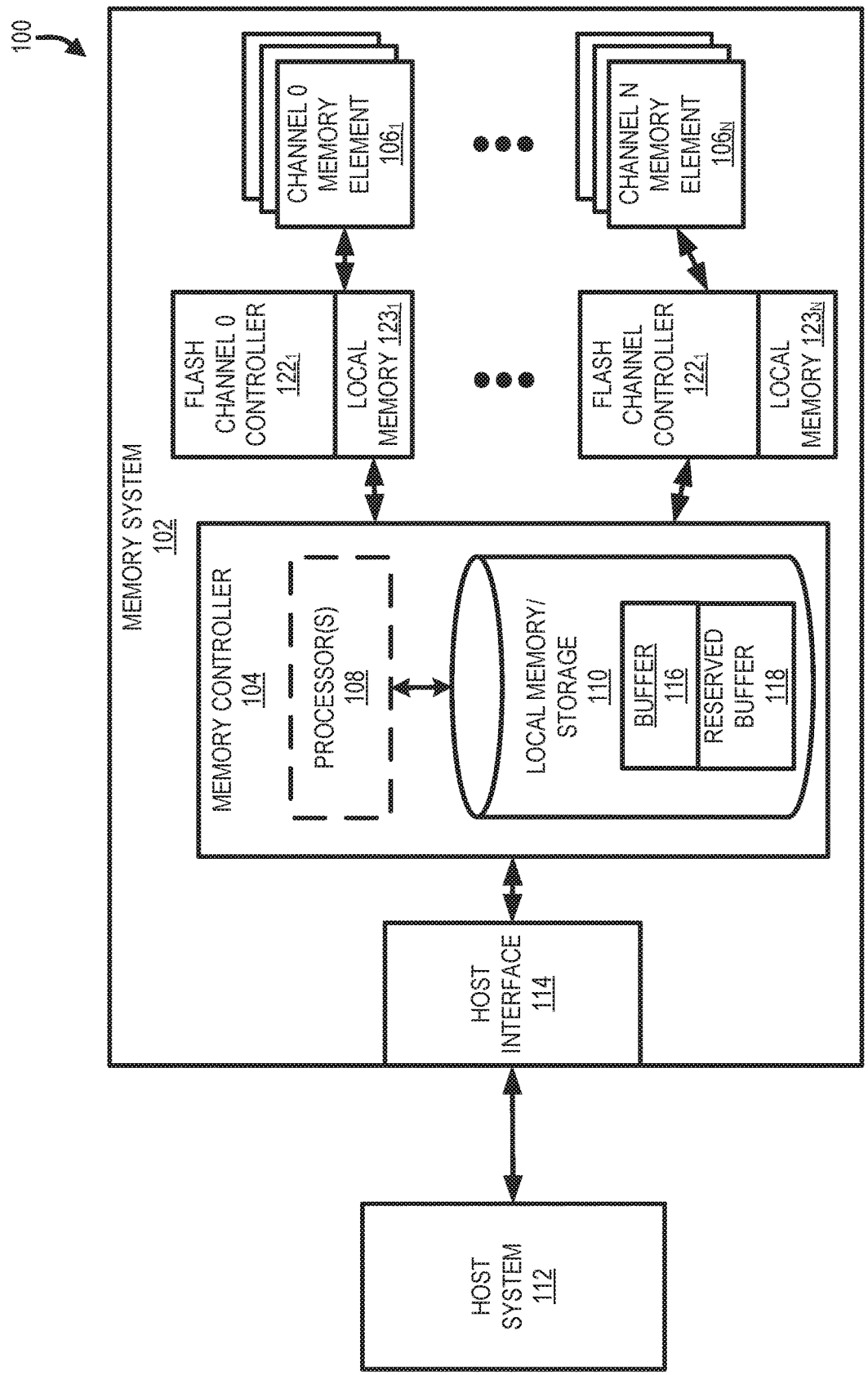
FIG. 1 is a functional block diagram of a computing system, including at least one memory system, in accordance with one or more embodiments.

FIG. 1 is a functional block diagram of a computing system 100, including at least one memory system 102, in accordance with one or more embodiments of the present disclosure. In the embodiment illustrated in FIG. 1, the memory system 102 includes a memory controller 104 and one or more memory elements $106_1$-$106_N$, which may correspond to separate memory channels. In this example, the memory controller 104 is external to the one or more memory elements $106_1$-$106_N$. The memory controller 104 may have circuitry that may include one or more integrated circuits and/or discrete components in addition to code/instructions for managing/controlling the memory elements $106_1$-$106_N$. The memory elements $106_1$-$106_N$ can provide a storage volume for the memory system 102 and/or the computing system 100 (e.g., the memory elements $106_1$-$106_N$ may be formatted with a particular file system for use by the computing system 100). The memory controller 104 includes control circuitry (e.g., hardware, firmware, and/or software) for controlling/managing the memory elements $106_1$-$106_N$. In one or more embodiments, the memory controller 104 is an application specific integrated circuit (ASIC) coupled to a printed circuit board, including a physical interface to the memory elements $106_1$-$106_N$. The memory controller 104 may utilize one or more processors 108 and/or local memory/storage 110 for use in controlling/managing the memory elements $106_1$-$106_N$. The processors 108 can be processing devices. For example, the processor 108 may be a central processing unit, microprocessor, integrated circuit, field programmable gate array, or other circuitry to read, write, and may maintain memory content as well as perform the embodiments set forth in this document and described (e.g., with reference to FIGS. 3-4).

As illustrated in FIG. 1, a host system 112 may be coupled to the memory system 102 via a corresponding host interface 114. The host system 112 may be or may be part of a personal computer (e.g., a laptop computer or a desktop computer), a digital camera, a digital recording and/or playback device, a mobile telephone, a personal digital assistant, a memory card reader, an interface hub, among other host systems, and may include a memory access device (e.g., one processor or a plurality of processors configured in a parallel processing system or as coprocessors). For example, in one embodiment, the computing system 100 is a personal computer and the host system 112 comprises a central processing unit that carries out the instructions of a computer program by performing the basic arithmetic, logical, control and input/output (I/O) operations specified by the instructions. One or more of these instructions may include or require access (e.g., read or write access) to user data stored in the memory elements $106_1$-$106_N$. Accordingly, the host system 112 may request access to the memory elements $106_1$-$106_N$ via commands or instructions passed to the memory controller 104 via the host interface 114.

In one or more embodiments, the host interface 114 is a standardized physical interface. For example, when the memory system 102 is used for data storage in the computing system 100, the host interface 114 may be a serial advanced technology attachment (SATA) interface, a peripheral component interconnect express (PCIe) interface, or a universal serial bus (USB) interface, among other standardized connectors and interfaces. In general, however, the host interface 114 may be comprised of any set of circuitry and protocols that provide an interface for passing control, address, data, and other signals between the memory system 102 and the host system 112.

Host system 112 communicates with memory system 102 via host interface 114. In one embodiment, host system 112 uses logical addresses to refer to storage managed by memory system 102. In this embodiment, memory system 102 (e.g., memory controller 104) maintains a mapping table between logical addresses used by host system 112 and physical addresses used by flash channel controllers $122_1$-$122_N$. The memory system 102 may store the mapping table in local memory 110. Local memory 110 (controller memory) also includes buffer 116 and reserved buffer 118 to, e.g., temporarily store data being written from host system 112 to memory element(s) 106 while memory controller maps logical addresses to physical addresses. In one embodiment, buffer 116 and reserved buffer 118 may be a buffer of volatile storage, such as DRAM (dynamic random access memory). Volatile memory may be referred to as volatile memory elements. In one embodiment, memory system 102 processes data stored in reserved buffer 118 before or otherwise with higher priority than data stored in buffer 116. Flash channel controller 122 includes local memory 123, which may include volatile memory for storing data, instructions, and maintain context for tracking in-flight write, erase, and read operations. The flash channel controller 122 may utilize one or more processors and/or local memory/storage for executing operations. The processors can be processing devices. In one embodiment, flash channel controller 122 maintains timers for in-flight operations.

In one embodiment, memory controller 104 manages read, write, and erase commands from host system 112 by communicating with flash channel controllers $122_1$-$122_N$. For example, memory controller 104 may receive a write command from host system 112 that includes a logical address and data to be written to memory element(s) 106. Memory controller 104 temporarily stores the data in buffer 116 while mapping the logical address to a physical address. In this embodiment, flash channel controllers $122_1$-$122_N$ manage read, write, and erase commands to memory elements $106_1$-$106_N$ in one or more channels. Continuing with the write command example, memory controller 104 passes the data and physical address to flash channel controller(s) 122 to continue execution of the write command. In some embodiments, flash channel controllers $122_1$-$122_N$ and memory elements $106_1$-$106_N$ communicate through an Open NAND Flash Interface (ONFi) bus. Flash channel controllers $122_1$-$122_N$ may include volatile storage and working registers (not illustrated). In this embodiment, flash channel controllers $122_1$-$122_N$ may use the volatile storage and working registers.

Each memory element $106_1$-$106_N$ may include one or more arrays of memory cells (e.g., non-volatile memory cells). The memory elements $106_1$-$106_N$ may each include a number of memory cells that can be grouped. As used herein, a group can include one or more memory cells, such as a page, block, plane, die, an entire array, or other groups of memory cells. For example, some memory arrays can include a number of pages of memory cells that make up a block of memory cells. A number of blocks can be included in a plane of memory cells. A number of planes of memory cells can be included on a die. As an example, a 128 GB memory device can include 4314 bytes of data per page, 128 pages per block, 2048 blocks per plane, and 16 planes per device. Sets of memory cells in a memory element 106 may be referenced using an assigned address. In particular, an address may be assigned to one or more memory cells in a memory element 106 such that the address may be used for accessing the corresponding memory cells (e.g., reading the one or more memory cells or writing to the one or more memory cells).

A group of memory cells in a memory element 106 may be used for storing user data (e.g., codewords). For example, each memory cell in a memory element 106 may be used for storing a single bit of user data. In one embodiment, memory cells may be capable of different storage modes. Each storage mode may be capable of storing a different number of bits. For example, a storage mode be capable of storing two, three, four, or more bits. In one embodiment, memory elements 106 may include a mix of single-level cell (SLC) memory (storing one bit per cell), multi-level cell (MLC) memory (storing two bits per cell), triple-level cell (TLC) memory (storing three bits per cell), and/or other memory cell types that store multiple bits per cell. In some embodiments, the storage mode of memory cells may depend on the physical location of the memory cell on the die. For example, memory cells near the edge of a die may be less reliable than memory cells in the center of the die and, thus, are suited for SLC memory. Storage modes may also require different amounts of time to successfully store the bits in the cell. Additionally, storage modes may have different power requirements. For example, the increase in bits stored per cell may correlate to an increase in programming time and power requirement.

In one embodiment, flash channel controller $122_1$ retrieves data from a working memory of memory element $106_1$ after determining that data failed to store at a first physical address in memory element $106_1$ and temporarily stores the retrieved data in reserved buffer 118 while requesting a second physical address from memory controller 104. Memory controller 104 looks up a logical block address assigned to the data using the first physical address and a mapping table stored in local memory 110. Memory controller 104 assigns a second physical address to the logical address and returns the second physical address to flash channel controller $122_1$. Flash channel controller $122_1$ initiates storage of the data at the second physical address.

Figure 2:
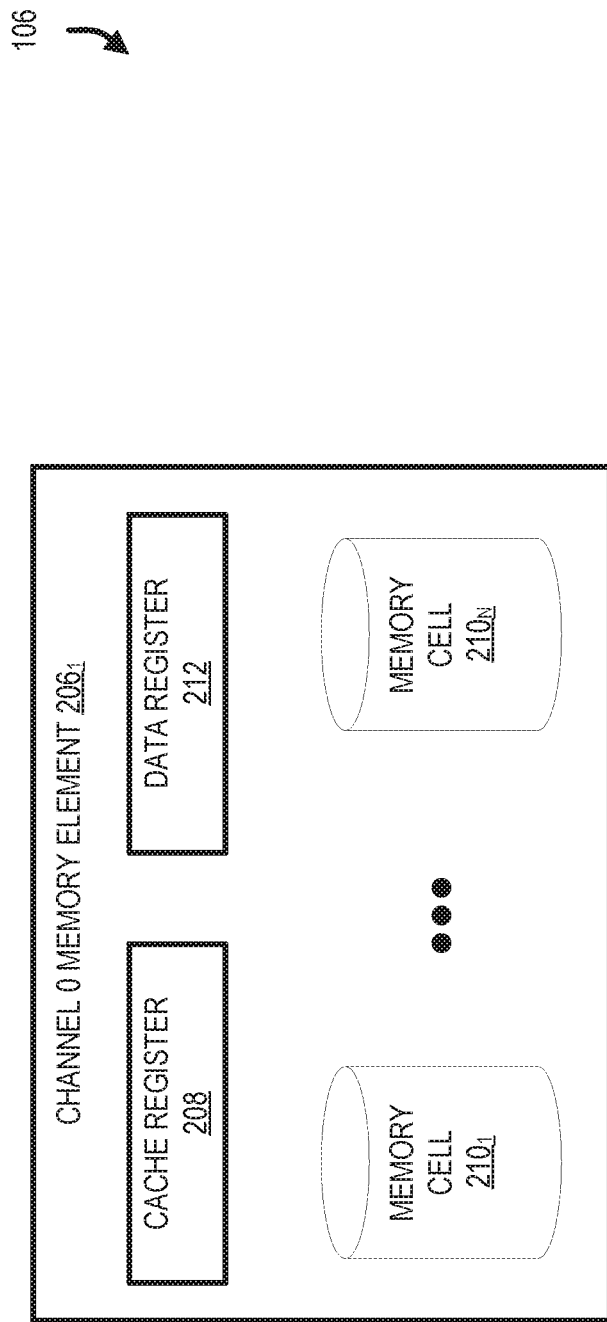
FIG. 2 is a functional block diagram of a memory element, in accordance with one or more embodiments.

FIG. 2 is a functional block diagram of a memory element 106 illustrated in FIG. 1. In one embodiment, a memory element 106 is a non-volatile memory die. Memory element 106 includes cache register 208 and data register 212 and memory cells $210_1$-$210_N$. In some embodiments, cache register 208 and data register 212 are volatile storage and memory cells 210 are non-volatile storage. Cache register 208 and data register 212 may be referred to as volatile working memory. Write operations may use cache register 208 and data register 212 as a working storage when preparing to write data to non-volatile memory cells $210_1$-$210_N$. For example, in a write operation, cache register 208 provides flash channel controller 122 access to write data to memory element 106. Once flash channel controller 122 has written the data to cache register 208 and memory element 106 is ready to commit the data to non-volatile storage, memory element 106 transfers the data from cache register 208 to data register 212. Memory element 106 completes the write by programming the data from data register 212 to one or more memory cells 210. Similarly, memory element 106 executes a read request by reading data from one or more memory cells 210 into data register 212. Such a read request would, e.g., include one or more row and column combinations (translated from a physical address) to access the data stored in memory cells 210. Memory element 106 transfers the data from data register 212 into cache register 208 and flash channel controller 122 reads/receives the data from cache register 208.

In one embodiment, requests from a flash channel controller to write data to a physical address are received at the cache register 208 and moved to data register 212 before a write to the physical address in memory cells 210 begins. After detecting a failed write operation (e.g., by a flash channel controller polling the memory element), the data and physical address can be moved back to cache register 208 from data register 212 to allow the flash channel controller to retrieve the data and the first physical address in order to request a new physical address from the memory controller 104.

Figure 3:
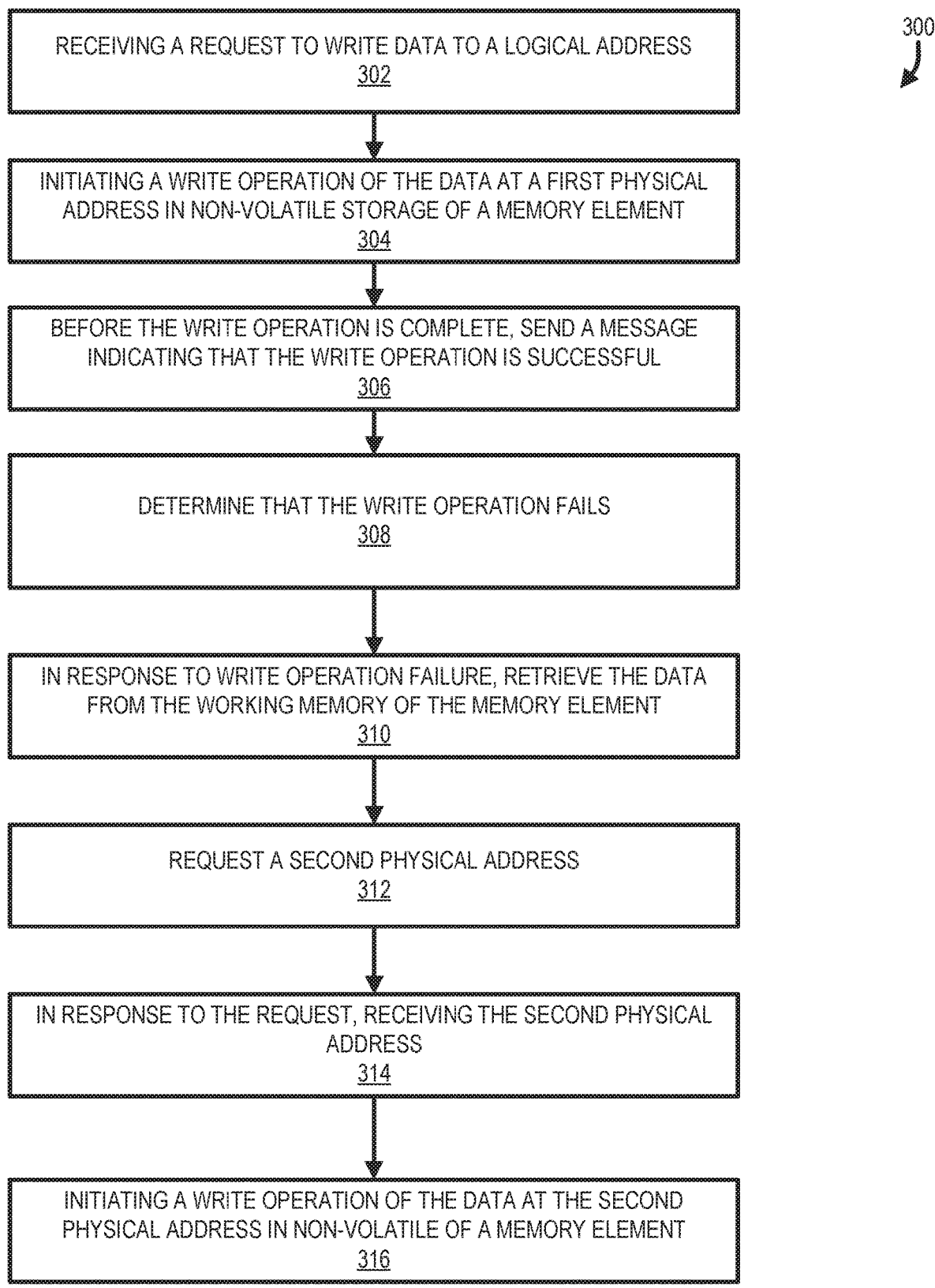
FIG. 3 is a flow chart illustrating an exemplary method of recovering and rewriting data after a failed write operation.

FIG. 3 is a flow chart illustrating exemplary method 300 of recovering and rewriting data after a failed write operation, in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof.

In some embodiments, the method 300 is performed by a processing device of a flash controller 122 of FIG. 1. In some embodiments, one or more operations of the method 400 can be performed by a processing device of the memory controller 104 or the host system 112 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 302, the processing device receives a request to write data to a logical address. For example, the flash channel controller 122 can receive the request from the memory controller 104. The request can include the data to be written and a physical address that corresponds to the logical address. In one embodiment, host system 112 sends the request through host interface 114 to memory controller 104 in memory system 102. In this embodiment, the memory controller 104 temporarily stores the request, including the data and the logical address, in buffer 116. The memory controller 104 may use the buffer 116 as temporary volatile storage when processing read and write requests from host interface 114. The memory controller 104 maps a first physical address to the logical address received at block 302. The memory controller 104 continues the write operation of the data received at block 302 by sending the data and the first physical address to the appropriate flash channel controller 122 based on the first physical address.

At block 304, the processing device initiates the write operation to memory element 106 that contains the first physical address. In one embodiment, the flash channel controller 122 sends a write instruction (e.g., a program instruction) to memory element 106. The write instruction includes the data and the first physical address. In this embodiment, flash channel controller 122 stores the write instruction, including the data, into cache register 208 in the memory element 106 in order to execute the request to write the data to non-volatile memory cells 210.

At block 306, the processing device sends an indication of success to memory controller 104 in response to writing the data and first physical address into cache register 208 and prior to the data being written to memory cell(s) 210. In response to the indication of success, memory controller 104 releases data stored in buffer 116. In one embodiment, the flash channel controller 122 starts a timer contemporaneously with sending the write instruction to memory element 106. In one embodiment, the memory controller 104 sends a message to host system 112 indicating that the write operation is successful before the data is written to the non-volatile memory in the memory element 106, e.g., in response to the flash channel controller 122 confirming to the memory controller 104 successful storage of the data in the cache register 208 of memory element 106. In one embodiment, the host system 112 releases one or more resources after receiving the message.

At block 308, the processing device determines that the write operation fails to store the data in non-volatile storage. In one embodiment, the flash channel controller 122 determines that the write operation fails by polling the memory element 106 until the write operations succeeds or fails to write the data to the non-volatile storage (e.g., memory cells $210_1$-$210_N$). In one embodiment, the write operation failure indicates that the non-volatile storage at the first physical address contains one or more malfunctioning non-volatile storage hardware (e.g., an inoperative region on a NAND flash chip). In this embodiment, memory system 102 adds the first physical address to a bad block list or other data structure tracking malfunctioning non-volatile storage. Adding an address to a bad block list may be referred to as being retired from use. For example, the flash channel controller 122 sends the first address and an indication of write failure to the memory controller 104. The memory controller 104 adds the first address to a data structure, e.g., in local storage 110, to avoid mapping future write requests to the malfunctioning storage area.

At block 310, in response to the write operation failure, the processing device retrieves the data from memory element 106 and copies the data from cache register 208 into reserved buffer 118. This embodiment may reserve the use of reserved buffers 118 for satisfying storage requirements when recovering from write failures. In some embodiments, the flash channel controller 122 issues a suspend command to the memory element 106 causing the memory element 106 to suspend execution of the write operation. The flash channel controller 122 may issue a reset command to memory element 106 causing the memory element 106 to abort the write operation while leaving the cache register 208 and/or data register 212 intact. In one embodiment, the flash channel controller 122 maintains state information about the write operation failure that can include the page type used by the write operation. The flash channel controller 122 can use the state information when copying the data from the cache register 208 to the reserved buffer 118.

At block 312, the processing device requests a second physical address from memory controller 104 for the data copied to reserved buffer 118. Given the failure to write the data to the first physical address, the processing device requests a second physical address at which the memory system 102 will store the data received at block 302. The request may include the first physical address. In an embodiment, the memory controller 104 services the request by locating the logical address corresponding to the first physical address in a table mapping logical addresses to physical addresses. In this embodiment, the memory controller 104 selects a second physical address at which to store the data and updates the mapping table to associate the second physical address with the logical address (i.e., replacing the mapping to the first physical address with a mapping to the second physical address). In one embodiment, memory controller 104 processes requests associated with reserved buffer 118 before or otherwise with higher priority than requests associated with buffer 116. As a result, a failed write attempt can be processed without being further delayed by subsequent read and write requests.

At block 314, the processing device receives the second physical address in response to the request sent at block 312. In one embodiment, the flash channel controller 122 receives the second physical address from the memory controller 104. In one embodiment, the second physical address is stored in the reserved buffer 118 with the data recovered from the memory element 106 at block 310.

At block 316, the processing device initiates a new write operation of the data at the second physical address in one of memory elements 106$_1$-106$_N$. For example, the flash channel controller 122 may receive an instruction from the memory controller 104 and may initiate the new write operation in response to completing the request for the second physical address. In one embodiment, the flash channel controller 122 uses the second physical address and the data stored in the reserved buffer 118 to transmit the data and a write instruction to the memory element corresponding to the second physical address. In some embodiments, a different flash channel controller 122 (than the flash channel controller 122 at block 304) initiates the new write operation at block 316. The change in flash channel controller 122 may be due to the second physical address residing in a different memory element 106 than the first physical address. In this embodiment, a different flash channel controller 122 manages the different memory element 106.

Figure 4:
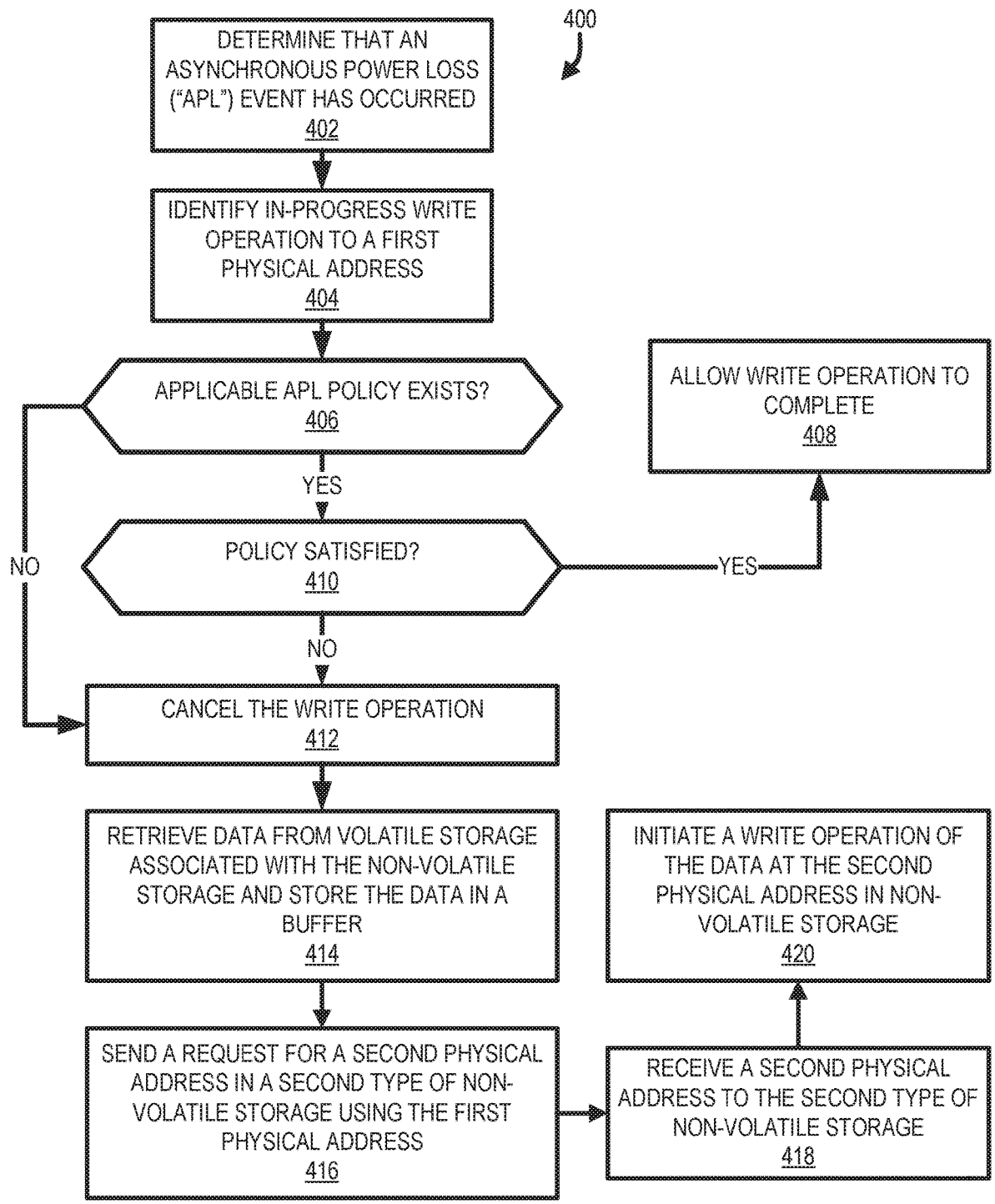
FIG. 4 is a flow chart illustrating an exemplary method of responding to an asynchronous power loss ("APL") event.

FIG. 4 is a flow chart illustrating exemplary method 400 of responding to an asynchronous power loss ("APL") event, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof.

In some embodiments, the method 400 is performed by a processing device of a flash controller 122 of FIG. 1. In some embodiments, one or more operations of the method 400 can be performed by a processing device of the memory controller 104 or the host system 112 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 402, the processing device determines that an asynchronous power loss ("APL") has occurred. In one embodiment, the flash controller 122 determines that the APL event occurs in response to a global interrupt from memory controller 104. The memory controller 104 may generate the global interrupt in response to APL detection by another component (e.g., internal or external to memory system 102). In one embodiment, memory controller 104 releases volatile storage in buffer 116 in response to the APL.

At block 404, the processing device identifies an in-progress write operation to a first physical address. For example, the flash channel controller 122 may maintain a timer and context information for each of one or more in-progress write operations that the flash channel controller 122 is managing. In one embodiment, the first physical address refers to one type of non-volatile storage, such as low-density storage (e.g., SLC). In another embodiment, the first physical address refers to another type of non-volatile storage, such as high-density storage (e.g., MLC, TLC, etc.).

At block 406, the processing device determines whether an applicable APL policy applies to the in-progress write operation. For example, the flash channel controller 122 may access APL policies resident in local memory 110 of the memory controller 104. In one embodiment, a policy is defined externally and stored in memory system 102. A policy may be defined as applying to write operations targeting non-volatile storage of a particular type/mode. For example, the policy may differentiate between low-density storage and high-density storage. If the flash controller 122 determines that an applicable policy exists, the processing device determines whether the policy is satisfied at block 410, as described in greater detail below. Otherwise, the processing device cancels the write operation at block 412, as described in greater detail below.

At block 410, the processing device determines whether the policy applicable to the write operation is satisfied. In one embodiment, different policies apply to different storage types/modes that are the target of the write operation. For example, a policy applicable to low-density (e.g., SLC) storage may allow the write operation to complete following detection of the APL. Another example policy applicable to high-density storage (e.g., MLC, TLC, etc.) may require cancellation of the write operation in response to the APL. Still another example policy applicable to high-density storage may require the flash channel controller 122 to compare the value of a timer corresponding to the write operation against an expected write operation duration associated with the policy. In one embodiment, the flash channel controller 122 maintains timers and address information about in-flight write operations using local memory 123. For example, if the expected time remaining for a write operation to high-density storage is less than a time threshold associated with the applicable policy, the flash channel controller 122 allows the write operation to complete. If the expected time remaining for the write operation to high-density storage is greater than the time threshold, the flash channel controller 122 cancels the write operation.

If the processing device determines that the policy is satisfied (block 410), the processing device allows the in-flight write operation to run to completion at block 408.

If the processing device determines that the policy is not satisfied (block 410), the processing device cancels the write operation at block 412. In one embodiment, processing device may cancel the write operation by sending one or more commands to the memory element associated with the first physical address. In one embodiment, the one or more commands cause the memory element to preserve the first physical address and the data to be written in its data register 212 and/or cache register 208.

At block 414, the processing device retrieves data from volatile storage associated with the non-volatile storage and stores the data in a buffer. In one embodiment, the volatile storage is one or both of the cache register 208 and the data register 212 of the memory element 106. In one embodiment, the processing device stores the data and the first physical address in reserved buffer 118 to prioritize a second attempt at writing the data. In an alternate embodiment, the processing device stores the data and the first physical address in buffer 116.

At block 416, the processing device sends a request for a second physical address pointing to non-volatile storage of a second type. Following the example policy set forth above, the processing device may have canceled an in-flight write operation directed to a first type of non-volatile storage (e.g., high-density storage). To expedite completion of the write, the processing device requests the second physical address to write the data instead to the second type of non-volatile storage (e.g., low-density storage). In one embodiment, the processing device sends the request to memory controller 104. In this embodiment, an address mapping table associates the first physical address with a logical address. The memory controller 104 updates the mapping table so that the logical address is now associated with a second physical address. In one embodiment, the second type of non-volatile storage is a region of NAND flash memory set to a single bit mode (e.g., SLC). In one embodiment, the memory controller 104 may select the second physical address from one or more ranges of single-bit NAND flash memory. In another embodiment, the memory controller 104 or the flash channel controller 122 may include in the write operation a command causing the memory element 106 to configure the non-volatile storage at the second physical address as single-bit memory.

At block 418, the processing device receives a second physical address to a second type of non-volatile storage. In one embodiment, the memory controller 104 sends the second physical address to the processing device of the flash channel controller 122 in response to the request sent at block 416.

At block 420, the processing device initiates a write operation of the data at the second physical address. In one embodiment, the second physical address is in the same memory element 106 as the first physical address. In another embodiment, the second physical address is in a different memory element 106. In this embodiment, the memory controller 104 sends the write instruction and second physical address to the processing device of the flash channel controller 122 associated with the memory element 106 in which the second physical address resides. The appropriate flash channel controller 122 initiates a write operation of the data in the reserved buffer 118 (or buffer 116) at the second physical address.

In one embodiment, the memory controller 104 or flash channel controller 122 encodes the data prior to storing the data in one or both of the cache register 208 and data register 212 of the memory element 106. In this embodiment, the encoding scheme may depend upon the type of non-volatile storage at the first physical address. At block 420, the processing device of the flash channel controller 122 or the processing device of the memory controller 104 may decode and/or reencode the data before the flash controller 122 stores the data in the cache and/or data registers of the memory element 106 containing the second physical address. In one embodiment, the second type of non-volatile storage defines the re-encoding scheme.

It will be apparent from this description that aspects of the inventions may be embodied, at least in part, in software. That is, a computer system or other data processing system, such as a flash channel controller may carry out the computer-implemented methods 300 and 400 in response to its processor executing sequences of instructions contained in a memory or other non-transitory machine-readable storage medium. The software may further be transmitted or received over a network (not shown) via a network interface. In various embodiments, hardwired circuitry may be used in combination with the software instructions to implement the present embodiments. It will also be appreciated that additional components, not shown, may also be part of a flash channel controller, and, in some embodiments, fewer components than that shown in FIG. 1 may also be used in a flash channel controller.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention.

In the foregoing specification, the invention has been described with reference to specific exemplary embodiments thereof. Various embodiments and aspects of the invention(s) are described with reference to details discussed in this document, and the accompanying drawings illustrate the various embodiments. The description above and drawings are illustrative of the invention and are not to be construed as limiting the invention. References in the specification to "one embodiment," "an embodiment," "an exemplary embodiment," etc., indicate that the embodiment described may include a particular feature, structure, or characteristic, but not every embodiment may necessarily include the particular feature, structure, or characteristic. Moreover, such phrases are not necessarily referring to the same embodiment. Furthermore, when a particular feature, structure, or characteristic is described in connection with an embodiment, such feature, structure, or characteristic may be implemented in connection with other embodiments whether or not explicitly described. Additionally, as used in this document, the term "exemplary" refers to embodiments that serve as simply an example or illustration. The use of exemplary should not be construed as an indication of preferred examples. Blocks with dashed borders (e.g., large dashes, small dashes, dot-dash, dots) are used to illustrate optional operations that add additional features to embodiments of the invention. However, such notation should not be taken to mean that these are the only options or optional operations, and/or that blocks with solid borders are not optional in some embodiments of the invention. Numerous specific details are described to provide a thorough understanding of various embodiments of the present invention. However, in certain instances, well-known or conventional details are not described in order to provide a concise discussion of embodiments of the present inventions.

It will be evident that various modifications may be made thereto without departing from the broader spirit and scope of the invention as set forth in the following claims. For example, the methods described in this document may be performed with fewer or more features/blocks or the features/blocks may be performed in differing orders. Additionally, the methods described in this document may be repeated or performed in parallel with one another or in parallel with different instances of the same or similar methods.

What is claimed is:

1. A computer-implemented method, comprising:
   detecting that an asynchronous power loss event ("APL") has occurred;
   determining that a write operation to a first type of non-volatile memory element is in progress, wherein the write operation includes a first physical address and a data, and wherein the first physical address corresponds to a logical address;
   canceling the write operation in response to determining that the write operation is to the first type of non-volatile memory element;
   retrieving the data from a volatile memory element associated with the non-volatile memory element of the first type;
   sending a request for a second physical address, wherein the request includes the first physical address and wherein the request designates a second type of non-volatile memory element;
   receiving the second physical address corresponding to the logical address, wherein the second physical address points to the second type of non-volatile memory element; and
   storing the data at the second physical address in the non-volatile memory element of the second type.

2. The method of claim 1, further comprising:
   determining, in response to the APL, that a second write operation is in progress;
   determining that the second write operation is to the second type of non-volatile memory element; and
   allowing the second write operation to complete.

3. The method of claim 1, further comprising:
   determining, in response to the APL, that a second write operation to the first type of non-volatile memory element is in progress;
   comparing a value of a timer associated with the second write operation to an expected write operation duration value, wherein the expected write operation duration value is associated with the first type of non-volatile memory element; and
   allowing, based on the comparing, the second write operation to complete.

4. The method of claim 1, wherein a write speed of the first type of non-volatile memory element is slower than a write speed of the second type of non-volatile memory element.

5. The method of claim 1, wherein a storage density of the first type of non-volatile memory element is greater than a storage density of the second type of non-volatile memory element.

6. The method of claim 1, further comprising:
   storing the data in a buffer, wherein the buffer is made available for canceled write operations in response to a global interrupt.

7. The method of claim 1, further comprising:
   determining, based on the first type of non-volatile memory element, an encoding scheme; and
   decoding, based on the encoding scheme, the data before storing the data at the second physical address.

8. A non-transitory computer-readable medium storing instructions, which when executed by a processing device, cause the processing device to perform a method comprising:
   detecting that an asynchronous power loss event ("APL") has occurred;
   determining that a write operation to a first type of non-volatile memory element is in progress, wherein the write operation includes a first physical address and a data, and wherein the first physical address corresponds to a logical address;
   canceling the write operation in response to determining that the write operation is to the first type of non-volatile memory element;
   retrieving the data from a volatile memory element associated with the non-volatile memory element of the first type;
   sending a request for a second physical address, wherein the request includes the first physical address and wherein the request designates a second type of non-volatile memory element;
   receiving the second physical address corresponding to the logical address, wherein the second physical address points to the second type of non-volatile memory element; and
   storing the data at the second physical address in the non-volatile memory element of the second type.

9. The non-transitory computer-readable medium of claim 8, the method further comprising:
   determining, in response to the APL, that a second write operation is in progress;
   determining that the second write operation is to the second type of non-volatile memory element; and
   allowing the second write operation to complete.

10. The non-transitory computer-readable medium of claim 8, the method further comprising:
    determining, in response to the APL, that a second write operation to the first type of non-volatile memory element is in progress;
    comparing a value of a timer associated with the second write operation to an expected write operation duration value, wherein the expected write operation duration value is associated with the first type of non-volatile memory element; and
    allowing, based on the comparing, the second write operation to complete.

11. The non-transitory computer-readable medium of claim 8, wherein a write speed of the first type of non-volatile memory element is slower than a write speed of the second type of non-volatile memory element.

12. The non-transitory computer-readable medium of claim 8, wherein a storage density of the first type of non-volatile memory element is greater than a storage density of the second type of non-volatile memory element.

13. The non-transitory computer-readable medium of claim 8, the method further comprising:
   storing the data in a buffer, wherein the buffer is made available for canceled write operations in response to a global interrupt.

14. The non-transitory computer-readable medium of claim 8, the method further comprising:
   determining, based on the first type of non-volatile memory element, an encoding scheme; and
   decoding, based on the encoding scheme, the data before storing the data at the second physical address.

15. A system comprising:
   a volatile memory element;
   a first type of non-volatile memory element;
   a second type of non-volatile memory element; and
   a processing device coupled to the volatile memory element, the first type of non-volatile memory element, and the second type of non-volatile memory element, the processing device configured to:
      detect that an asynchronous power loss event ("APL") has occurred;
      determine that a write operation to the first type of non-volatile memory element is in progress, wherein the write operation includes a first physical address and a data, and wherein the first physical address corresponds to a logical address;
      cancel the write operation in response to determining that the write operation is to the first type of non-volatile memory element;
      retrieve the data from the volatile memory element associated with the non-volatile memory element of the first type;
      send a request for a second physical address, wherein the request includes the first physical address and wherein the request designates the second type of non-volatile memory element;
      receive the second physical address corresponding to the logical address, wherein the second physical address points to the second type of non-volatile memory element; and
      store the data at the second physical address in the non-volatile memory element of the second type.

16. The system of claim 15, the processing device further configured to:
   determine, in response to the APL, that a second write operation is in progress;
   determine that the second write operation is to the second type of non-volatile memory element; and
   allow the second write operation to complete.

17. The system of claim 15, the processing device further configured to:
   determine, in response to the APL, that a second write operation to the first type of non-volatile memory element is in progress;
   compare a value of a timer associated with the second write operation to an expected write operation duration value, wherein the expected write operation duration value is associated with the first type of non-volatile memory element; and
   allow, based on the comparing, the second write operation to complete.

18. The system of claim 15, wherein a write speed of the first type of non-volatile memory element is slower than a write speed of the second type of non-volatile memory element.

19. The system of claim 15, the processing device further configured to:
   store the data in a buffer, wherein the buffer is made available for canceled write operations in response to a global interrupt.

20. The system of claim 15, the processing device further configured to:
   determine, based on the first type of non-volatile memory element, an encoding scheme; and
   decode, based on the encoding scheme, the data before storing the data at the second physical address.

* * * * *